United States Patent

Usui

[19]

[11] Patent Number: 5,924,798
[45] Date of Patent: Jul. 20, 1999

[54] HYDRODYNAMIC BEARING APPARATUS AND METHOD FOR MANUFACTURING THEREOF

[75] Inventor: Motonori Usui, Nagano, Japan

[73] Assignee: Sankyo Seiki Mfg. Co., Ltd., Nagano-ken, Japan

[21] Appl. No.: 08/972,610

[22] Filed: Nov. 18, 1997

[30] Foreign Application Priority Data

Nov. 19, 1996 [JP] Japan .................................. 8-323432

[51] Int. Cl.⁶ ................................................. F16C 33/10
[52] U.S. Cl. ........................................ 384/114; 384/115
[58] Field of Search .................... 384/114, 115, 384/113, 280, 276

[56] References Cited

U.S. PATENT DOCUMENTS 5,683,183 11/1997 Tanaka et al. .

Primary Examiner—Lenard A. Footland
Attorney, Agent, or Firm—McAulay Nissen Goldberg Kiel & Hand, LLP

[57] ABSTRACT

A hydrodynamic bearing apparatus and a method for manufacturing a hydrodynamic bearing apparatus consists of providing a shaft and rotatably fitting the shaft to a bearing. Hydrodynamic pressure generating grooves are cut on the bearing surface of either the bearing or the shaft. The bearing surface that has the hydrodynamic pressure generating grooves thereon faces another bearing surface so that the bearing and shaft rotate with respect to one another, and the bearing or the shaft that has a bearing surface having the hydrodynamic pressure generating grooves is comprised of a thick main body member and a thin sleeve fitted to the main body member. The thin sleeve is thinner and made of a softer material than the main body member, the thin sleeve is evenly deformed, and the hydrodynamic pressure generating grooves are cut on a surface of the thin sleeve.

21 Claims, 5 Drawing Sheets

HYDRODYNAMIC BEARING APPARATUS AND METHOD FOR MANUFACTURING THEREOF

BACKGROUND OF THE INVENTION a) Field of the Invention

The present invention relates to a hydrodynamic bearing apparatus in which a shaft and a bearing are relatively and rotatably supported by hydrodynamic pressure of a bearing fluid. The present invention further relates to a method for making a hydrodynamic bearing apparatus.

b) Description of the Related Art

Conventionally, a hydrodynamic bearing apparatus is known in which a shaft and a bearing are relatively and rotatably supported by hydrodynamic pressure of a bearing fluid. In such a hydrodynamic bearing apparatus, if a bearing is made of a relatively soft material, such as copper alloy, to facilitate machining in the process of manufacturing, a problem occurs in the following way. When a bearing apparatus made of copper alloy and the like is applied in a motor of high-speed spins, a bearing gap becomes wider at a high temperature and narrower at a low temperature as the environmental temperature changes due to the high-speed spin, thus changing the bearing fluid viscosity required for generating hydrodynamic pressure. This degrades the hydrodynamic bearing property, that is, a motor property, thus making it previously impossible to make the bearing of a relatively soft material, e.g., a copper alloy. For this reason, in order to obtain a desired motor property, the bearing has been made of a metallic material that has low thermal expansion, e.g., stainless steel, ferrous material, or Ni-alloy. These materials are not easily affected by thermal expansion caused by changes in environmental temperature as compared to bearings made of a copper alloy.

Typically, a bearing is produced as follows. A bearing blank is initially produced from a pure material, the bearing blank is processed by rough machining and then rough finishing so as to produce a hole in the center on an inner circle surface of the bearing blank. The resultant bearing is machined to create an oil reservoir between the bearing portions, machined to cut hydrodynamic pressure generating grooves on the bearing portion, and bearing machined as the final machining step.

The above mentioned hydrodynamic bearing apparatus and manufacturing method, however, have the following problems. When a bearing member is made of metallic material having low thermal expansion, such as stainless steel, ferrous material, or Ni-alloy, and because these materials are generally difficult to machine (e.g., cut, roll, etc.), the precision of the machined hydrodynamic pressure generating grooves and the like (e.g., the precision of post-machining) is quite low. In addition, such machining takes a considerably long time. Still further, tools having a long tool life, e.g., diamond tools, cannot be used during the above-mentioned machining processes and, thus, tools having a relatively short life disadvantageously must be used.

OBJECTS OF THE INVENTION

It is therefore an object of the present invention to provide a hydrodynamic bearing apparatus and method for producing the same in which the precision in the machining thereof is improved over that of previous devices.

It is another object of the present invention to provide a hydrodynamic bearing apparatus and method for producing the same in which the machining time thereof is shortened.

It is a further object of the present invention to provide a hydrodynamic bearing apparatus and method for producing the same in which the tool life of the tools used for the machinings is prolonged.

It is an additional object of the present invention to provide a hydrodynamic bearing apparatus and method for producing the same in which the motor property is not degraded even when environmental temperature changes.

Various other objects, advantages and features of the present invention will become readily apparent to those of ordinary skill in the art, and the novel features will be particularly pointed out in the appended claims.

SUMMARY OF THE INVENTION

In accordance with an embodiment of the present invention, a hydrodynamic bearing apparatus and method for manufacturing the same are provided by rotatably fitting a shaft to a bearing and cutting hydrodynamic pressure generating grooves on a bearing surface of the bearing or the shaft. The bearing surface that has the hydrodynamic pressure generating grooves thereon faces another bearing surface so that the bearing and shaft rotate with respect to one another, and the bearing or the shaft that has a bearing surface having the hydrodynamic pressure generating grooves is comprised of a thick main body member and a thin sleeve fitted to the main body member. The thin sleeve is thinner and made of a softer material than the main body member, the thin sleeve is evenly deformed, and the hydrodynamic pressure generating grooves are cut on a surface of the thin sleeve.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts.

DETAILED DESCRIPTION OF THE PREFERRED EMBODIMENTS

Figure 1:
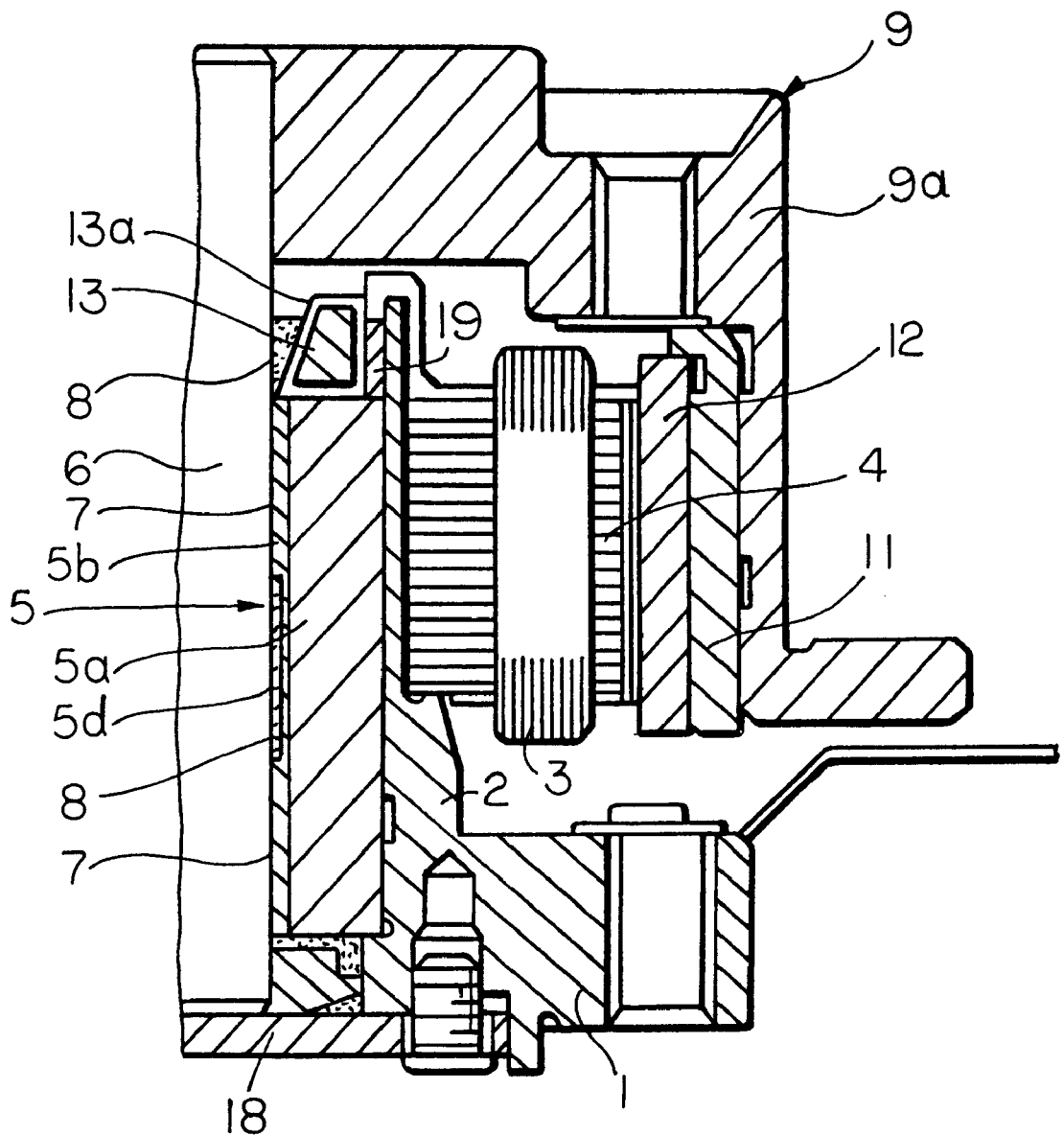
FIG. 1 is a cross-sectional half view of a rotary shaft type HDD (hard disk drive) spindle motor in which the present invention is applied.

Referring now to the drawings, FIG. 1 is a cross-sectional half view of a rotary shaft type HDD (hard disk drive) spindle motor in which the present invention is applied. The motor illustrated in FIG. 1 comprises a stator assembly installed on the side of a frame 1 for fixing a bearing device to a main driving device and a rotor assembly installed axially against the stator assembly.

A cylindrical bearing holder 2 is provided vertically on the fixed frame 1. A stator core 4 around which a wire 2 is wound is mounted outside an outer circle of the cylindrical bearing holder 2. A radial bearing member 5 is mounted inside an inner circle of the bearing holder 2.

The bearing member 5 has a cylindrical bearing ring 5a as a bearing body thereof, mounted on the inner circle surface of the bearing holder 2 and a thin sleeve 5b press-fitted to the bearing ring 5a. An oil reservoir 5d, which is made by widening a space created with a rotary shaft 6 as a shaft member than a bearing gap, is annularly formed at the axially center on an inner circle surface of the thin sleeve 5d (a shaft-facing surface). Also on axially both sides of the oil reservoir 5d, a publicly known herringbone hydrodynamic pressure generating grooves 5c, 5c, for example, (see FIG. 2 (e)) are cut annularly in parallel. The oil reservoir 5d may be formed using only the thin sleeve 5b or machining the inner circle surface of the bearing ring 5b as well as the thin sleeve 5b.

The bearing ring 5a is formed on a hard material having low thermal expansion, such as stainless steel, ferrous material, or Ni-alloy.

The thin sleeve 5b is extremely thin compared with the bearing ring 5a and made of a softer material than that of the bearing ring 5a, such as phosphorous bronze. Note that the thin sleeve 5a is not limited to be made of phosphorous bronze, but can be made of any other softer materials than that of the bearing ring 5a, such as brass, copper, nickel, or German silver.

Inside the thin sleeve 5b of the radial bearing member 5, the rotary shaft 6 is inserted. A pair of hydrodynamic bearing portions 7, 7 are formed axially in parallel with circumferentially facing surfaces between the bearing surface having hydrodynamic pressure generating grooves 5c, 5c and the rotary shaft 6. Also in a cylindrical space, including both hydrodynamic bearing portions 7, 7 (also including the oil reservoir 5d), a magnetic fluid 8 as a bearing fluid is filled without interruption. By hydrodynamic pressure generating grooves 5c, 5c, the rotary shaft 6 is rotatably supported with respect to the radial bearing member 5. Note that when using a magnetic fluid as a bearing fluid, a magnetic material is (normally) used for the shaft member; however, the bearing fluid is not necessarily a magnetic fluid, and in this case, the shaft member may not be made of magnetic material. In addition, the method of filling bearing fluid is not limited to a continuous filling but may be any other methods.

A hub 9 is secured in the upper portion of the rotary shaft 6 in the figure. The hub 9 has a hollow cylindrical frame portion 9a, and a medium such as a magnetic disk is loaded on an outer surface thereof. An annular drive magnet 12 is mounted on an inner surface of the frame portion 9a via an annular back yoke 11 to constitute a motor. The drive magnet 12 is arranged such that it annularly faces the outer surface of the aforementioned stator core 4.

The portion in a frame 1 opposite the rotary shaft 6 is closed with a thrust plate 18. Between the thrust plate 18 and rotary shaft 6, the above mentioned magnetic fluid 8 in the hydrodynamic bearing portion 7 is continuously filled without interruption. Hydrodynamic pressure generating grooves are cut on at least one of the top surface (in the figure) of the thrust plate 18 and bottom surface (in the figure) of the rotary shaft 6. By hydrodynamic pressure of the magnetic fluid 8 generated by the pumping action of the hydrodynamic pressure generating grooves, the rotary shaft 6 is supported and suspended with respect to the thrust plate 18.

On an opening at the upper end (in the figure) in the bearing member 5, a hollow cylindrical sealing magnet 13 is provided for preventing the magnetic fluid from leaking outside. An outer surface of the sealing magnet 13 is secured to a ring-shaped magnetic yoke 19 mounted on the inner surface of the bearing holder 2. The inner surface 13a of the magnet 13 is formed as a tapered inclining wall surface in which the radius length with respect to the outer surface of the rotary shaft 6 is continuously widened toward the external opening (upwardly in the figure). The above mentioned magnetic fluid 8 is continuously filled from the hydrodynamic bearing portion 7, without interruption, up to a predetermined position in the axial direction of the inclining wall surface 13a of the sealing magnet 13.

In other words, magnetic flux from the sealing magnet 13 forms a magnetic path passing the rotary shaft made of magnetic material, bearing member 5, and magnetic yoke 19, and exerts on the magnetic fluid 8 between the rotary shaft 6 and sealing magnet 13. Also as the gap distance is changed due to the inclining wall surface 13a widened outwardly, the density of the magnetic flux formed between the rotary shaft 6 and sealing magnet 13 gradually becomes low toward the external opening. As a result, the magnetic fluid 8 is excellently and magnetically held between the rotary shaft 6 and sealing magnet 13, thus preventing the fluid from leaking toward the external opening.

Next a method of manufacturing a radial bearing 5 will be described with reference to FIG. 2. The thin sleeve 5b as an inner sleeve is obtained in the following manner. First a pipe material 20 (see FIG. 2 (a)) is made from a bar material consisted of phosphorous bronze, brass, copper, nickel, or German sliver by drawing such that the thickness thereof is 0.2 mm–0.4 mm and a lateral press-fitting allowance to the bearing ring 5a which is an outer sleeve is 0.001 mm–0.04 mm. Then both ends of the pipe material 20 are cut to obtain the thin sleeve 5b illustrated in FIG. 2 (b).

Figure 2:
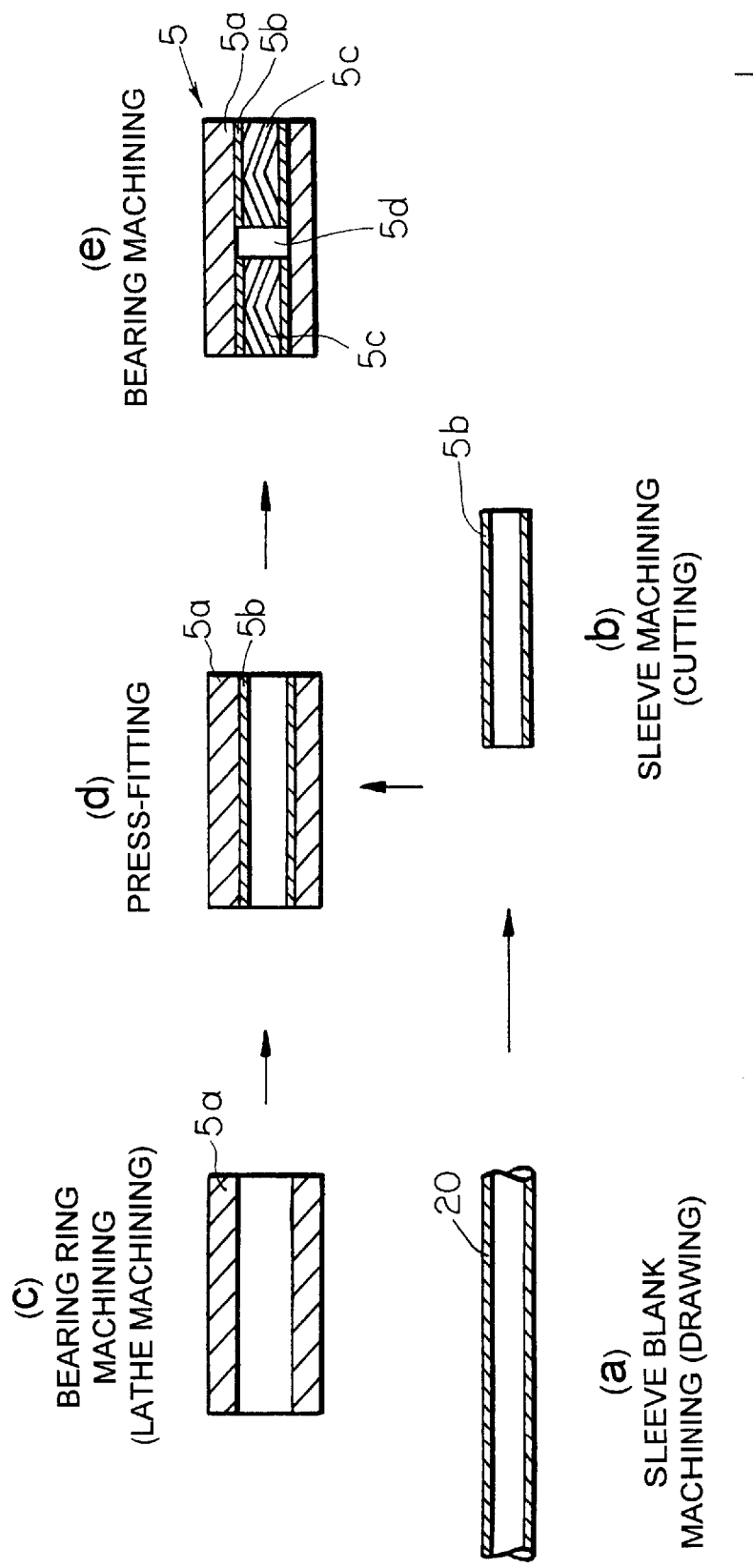
FIGS. 2a–g illustrate steps of a manufacturing method to obtain the hydrodynamic bearing apparatus illustrated in FIG. 1.

The bearing ring 5a as a bearing body is obtained as illustrated in FIG. 2 © in such a manner that a cylindrical bearing blank is first manufactured of a pure material consisted of stainless steel, ferrous material, or Ni-alloy, and then a lace machining is provided to required areas (especially an inner circle surface).

After obtaining the bearing ring 5a and thin sleeve 5b in the above manner, the thin sleeve 5b is press-fitted to the bearing ring 5a as shown in FIG. 2 (d). At that time, the thin sleeve 5b is evenly compressed and deformed to be press-fitted excellently maintaining the circularity with respect to the bearing ring 5a because, as described above, it is thinner than the bearing ring 5a but thick enough for having hydrodynamic pressures generating grooves formed, and 0.2 mm–0.4 mm thick to be able to be press-fitted. In order to ensure the press-fitting of the thin sleeve 5b into the bearing ring 5a, the inner circle surface of the press-fitted thin sleeve 5b may be deformed to be widened by a ball, pin, or the like to more firmly fix the thin sleeve 5b to the bearing ring 5a.

After a while, the inner circle surface of the thin sleeve 5b is given rough machining and rough finishing for a hole, machinings for forming an oil reservoir 5d and hydrodynamic pressure generating grooves 5c, and a bearing machining as a final machining to obtain the bearing member 5 as illustrated in FIG. 1 and FIG. 2 (e). Note that the hydrodynamic pressure generating grooves 5c may be formed by not cutting but rolling and the like.

As described above, in this embodiment, since the thin sleeve 5b is made thinner than the bearing ring 5a and capable of being evenly compressed and deformed, it can be press-fitted, maintaining circularity, to the bearing ring 5a. In addition, making the thin sleeve 5b of softer material than that of the bearing ring 5a improves machinability.

Therefore, precision in predetermined machinings given to the shaft-facing surface, such as a machining of the hydrodynamic pressure generating grooves 5c, can be improved, and the machining time can be shortened. Further, tool life of the tools used for predetermined machinings is prolonged.

Also, since the bearing ring 5a for holding the thin sleeve 5b is made thicker of a harder material than that of the thin sleeve 5b, it is not easily affected by thermal expansion caused by changes in environmental temperature. Thus, motor properties can be prevented from being degraded even when environmental temperature changes.

Note that the surface roughness of the worked surface of the bearing member 5 obtained in the above mentioned manufacturing method is 0.4S or less; the waviness of the worked surface is reduced to ⅓ of a conventional surface; and the measurement error of the worked surface is reduced to ½ of a conventional surface. As described, precision in machining is greatly improved. compared to the conventional technology. Further, the machining time is reduced to ½ of conventional technology, thus greatly shortening the machining time compared to conventional technology. Furthermore, since diamond tools and the like can be used for machining, tool life is prolonged over 50 times longer than conventional tools, thus greatly improving tool life compared to conventional technology.

In the above embodiment, the entire thin sleeve 5b is manufactured in such a manner that a pipe material 20 is first made to have 0.001 mm–0.04 mm of a lateral press-fitting allowance to the bearing ring 5a and then the thin sleeve 5b is press-fitted to the bearing ring 5a. Note that, however, the outer diameter of the thin sleeve 5b may be made almost the same as or slightly smaller than the inner diameter of the bearing ring 5a; the thin sleeve 5b is insertion-fitted in the bearing ring 5a; then, the inner circle surface of the thin sleeve 5b is deformed, being widened by a ball, pin, or the like, to fix the thin sleeve 5b inside the bearing ring 5a.

Figure 3:
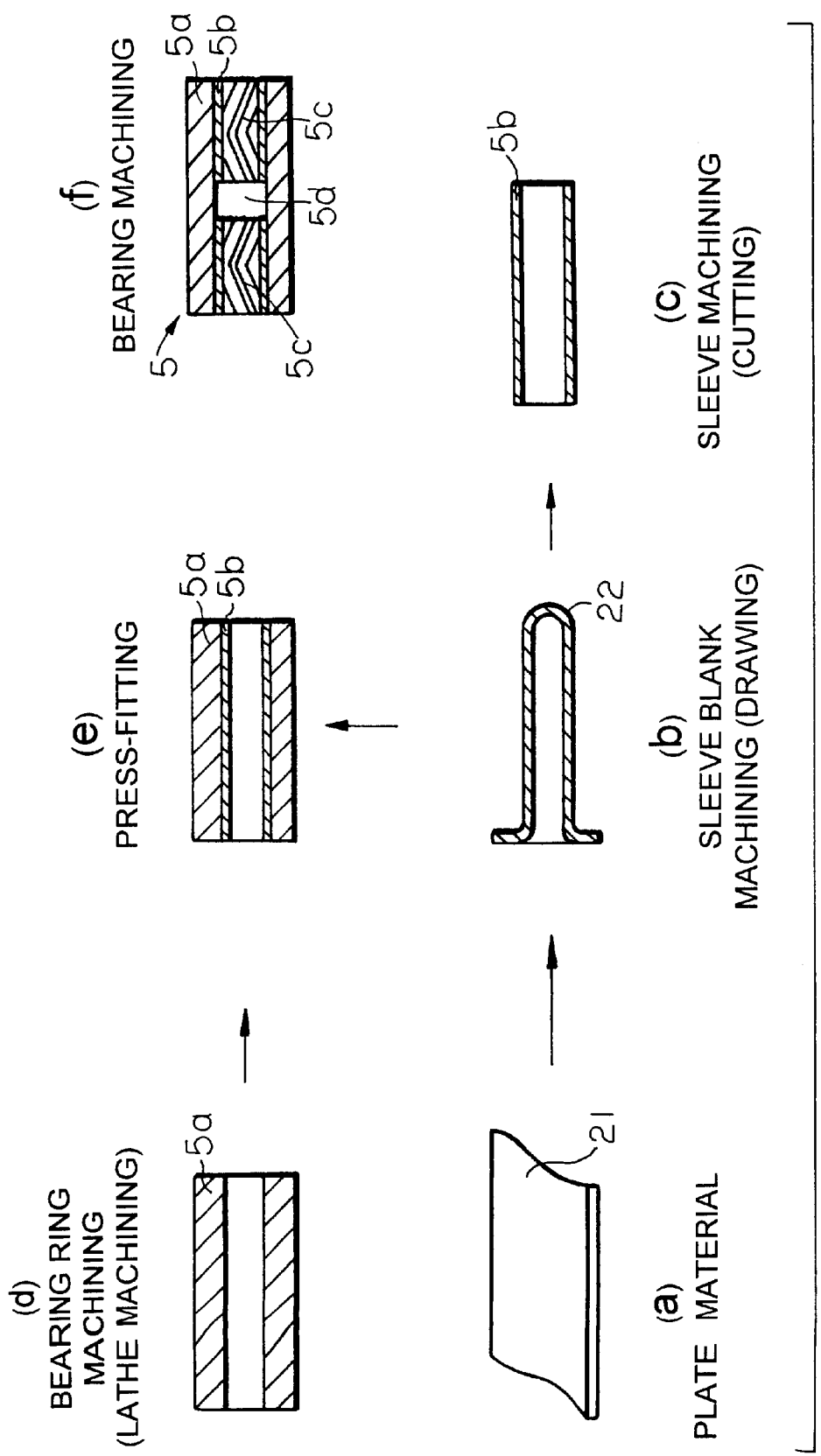
FIGS. 3a–g illustrate steps of another manufacturing method to obtain the hydrodynamic bearing apparatus illustrated in FIG. 1.

Another method of manufacturing the radial bearing 5 will be described with reference to FIG. 3. A sleeve blank 22, a cylindrical projection, (see FIG. 3 (b)) which has the same thickness and press-fitting allowance to the bearing ring 5a as that of the previous embodiment is made of a thin, flat plate material 21 shown in FIG. 3 (a) consisted of phosphorous bronze, brass, copper, nickel, or German silver. Then, both ends of the cylindrical projection of the sleeve blank 22 are cut to obtain the thin sleeve 5b as illustrated in FIG. 3 (c). Also, the bearing ring 5a as a bearing body as illustrated in FIG. 3 (d) can be obtained by using the same material in the same manner as the previous embodiments.

After obtaining the bearing ring 5a and bearing sleeve 5b in the above manner, the bearing member 5 as illustrated in FIG. 3 (f) can be obtained through the steps shown in FIGS. 3 (e) and (f) which are the same as FIGS. 2 (d) and (e) for the previously described embodiment.

A further method of manufacturing the bearing member 5 will be described with reference to FIG. 4. For making the thin sleeve 5b, first the sleeve blank 22, a cylindrical projection, illustrated in FIG. 4 (b) is obtained in the same manner as that in the embodiment described with reference to FIG. 3. Also, the bearing ring 5a, a bearing body, as illustrated in FIG. 4 ⓒ is obtained in the same manner as the previous embodiment.

Figure 4:
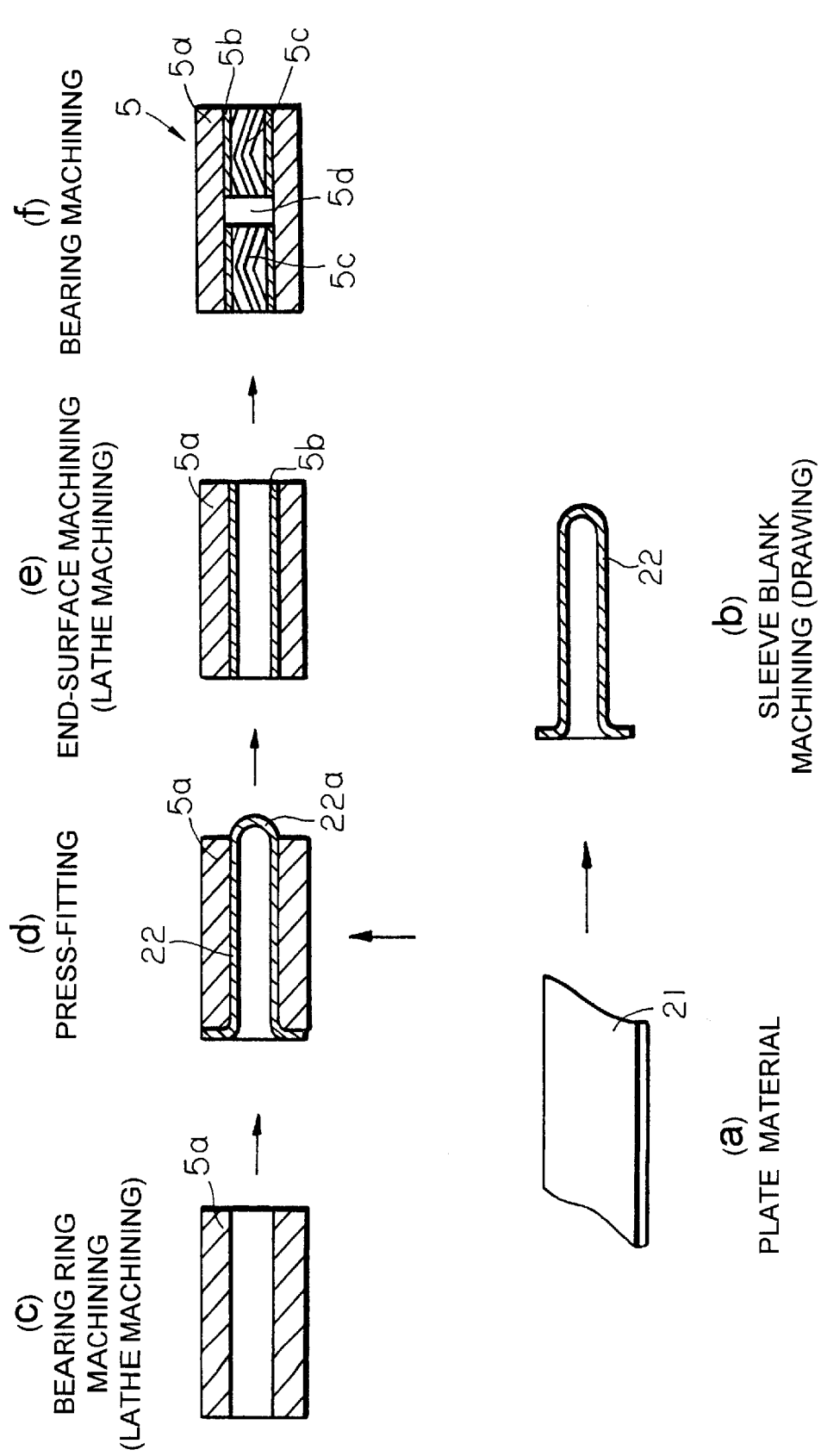
FIGS. 4a–g illustrate steps of a further manufacturing method to obtain the hydrodynamic bearing apparatus illustrated in FIG. 1.

After obtaining the bearing ring 5a and sleeve blank 22 in the above manner, as illustrated in FIG. 4 (d), the sleeve blank 22 is press-fitted to the bearing ring 5a using a pointed end 22a of the cylindrical projection of the sleeve blank 22 as an insertion guide. Then, both ends of the sleeve blank 22 are removed through an end-surface lathe machining to obtain the bearing ring 5a and the thin sleeve 5b press-fitted to the bearing ring 5a as illustrated in FIG. 4 (e). A step shown in FIG. 4 (f) is performed in the same manner as that shown in FIG. 3 (f) to provide the bearing member 5 illustrated in FIG. 4 (f).

It is understood that the same effects as the previous embodiments can be also obtained in this embodiment. In addition, the projection pointed end 22a of the sleeve blank 22 working as a guide when press-fitted to the bearing ring 5a makes press-fitting easy.

The embodiments of the present invention have been described above in detail. However, it is needless to say that the present invention is not limited to the above embodiments, but can be variously modified within the scope of the invention.

In the above embodiments, for example, after the thin sleeve 5b is press-fitted to the bearing ring 5a, a sizing bar and the like, is inserted to the thin sleeve 5b to widen to modify the width of the inner diameter of the thin sleeve 5b so as to match the inner circle surface of the bearing ring 5a. In this way, the circularity of the thin sleeve 5b press-fitted to the bearing ring 5a can be more excellently obtained, and at the same time, its attachment (adhesiveness) to the bearing ring 5a is improved.

In the above mentioned embodiments, the preferred thickness of the thin sleeve 5b is in the range of 0.2 mm–0.4 mm. However, as long as the thickness is within the range of 0.1 mm–0.6 mm, the thin sleeve 5b can be press-fitted or inserted well while maintaining the circularity with respect to the bearing ring 5a.

In the hydrodynamic bearing apparatus as illustrated in FIG. 1, the bearing holder 2 is made to stand on the fixed frame 1 or fixing the bearing apparatus and motor to a main apparatus, and then, the cylindrical bearing ring 5a is fixed to the bearing holder 2. However, the bearing ring 5a and the fixed frame 1 including the bearing holder 2 can be made as a single entity, and the thin sleeve 5b may be press-fitted to the inner circle surface of a portion in the single entity corresponding to the bearing ring 5a. In that case, although the bearing body is no longer a simple cylindrical shape, it will be simply a component in which a circular or square flange portion, a frame portion, is integrally formed at the outer circle portion of the cylindrical ring. Therefore, the thin sleeve 5b can be press-fitted in the same manner as the previous embodiments.

The hydrodynamic bearing apparatus of the above mentioned embodiments can be also applied to motors for driving various kinds of rotary plates such as polygonal mirrors other than disks, motors using oil as a bearing fluid other than magnetic fluid, motors using air and the like, a so-called shaft-fixed type motor in which a shaft is fixed and a bearing rotates, and other hydrodynamic bearing apparatus than motors.

For the above mentioned shaft-fixed type motor, being different from the embodiments of shaft-rotary type motor illustrated in FIG. 1, a shaft member is fixed to the fixed frame 1, the bearing holder 2 is integrally formed with the rotary hub 9 which holds the disk, and then the cylindrical bearing ring 5a is secured to the bearing holder 2. In this case also, the bearing ring 5a may be formed in a simply cylindrical shape, being separated from the bearing holder, or the bearing ring 5a and the rotary hub 9 including the bearing holder 2 are formed as a single entity to construct a bearing body, and the thin sleeve 5b may be press-fitted to the inner circle surface of a portion in the bearing body corresponding to the bearing ring 5a.

In the above embodiments, a hydrodynamic bearing apparatus in which hydrodynamic pressure generating grooves are cut on the bearing member is described. However, the present invention can be also applied as a fixed-shaft type motor or a rotary-shaft type motor in a hydrodynamic bearing apparatus in which hydrodynamic pressure generating grooves are cut on the shaft. In that case, the shaft comprises a thin central shaft having a circular outer circle surface, which is a main body member of the shaft, and a thin sleeve made thinner of a softer material than that of the central shaft, capable of being evenly deformed being widened, and press fitted to the outer circle surface of the central shaft. Hydrodynamic pressure generating grooves may be formed on the outer circle surface of the thin sleeve by a publicly known method. For this, a shaft can be made in the following way: the central shaft may be press-fitted to the pipe material 20 as illustrated in FIG. 2 (*a*) and the thin sleeve is press-fitted to the outer circle surface of the central shaft. But it may be made by the manufacturing method described below.

Figure 5:
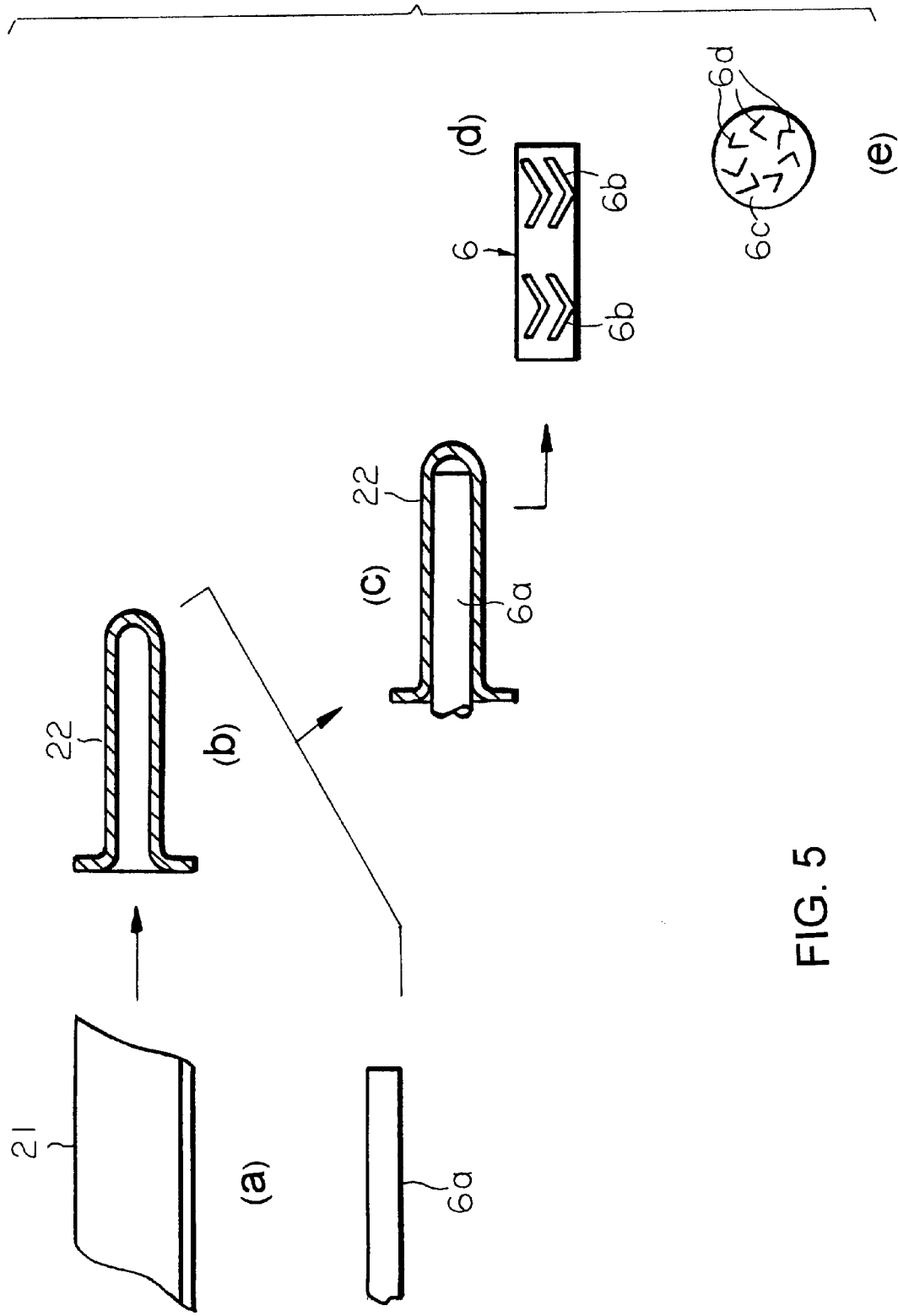
FIGS. 5a–g illustrates steps of an additional manufacturing method to obtain the hydrodynamic bearing apparatus illustrated in FIG. 1.

FIG. 5 shows a method of manufacturing a shaft 6 used for forming the thin sleeve 5*b* on the shaft side. The thin sleeve 5*b* is obtained in the following manner. The sleeve blank 22, a cylindrical projection, (see FIG. 5 (*b*)) is first made of the flat thin plate material 21 as illustrated in FIG. 5 (*a*), such that it has the same press-fitting allowance to the central shaft 6*a* of the shaft 6 as that in the previous embodiments. Then, the central shaft 6*a* is press-fitted into the cylindrical projection of the sleeve blank 22. Thus, the central shaft 6*a* to which the thin sleeve 5*b* is fitted and fixed can be obtained as illustrated in FIG. 5 (*c*). After this, radial hydrodynamic pressure generating grooves 6*b* are formed on the outer circle surface of the thin sleeve 5*b* by a publicly known method to manufacture the shaft member 6 illustrated in FIG. 5 (*d*). Note that with the state that the central shaft 6*a* is fixed, being fitted into the thin sleeve 5*b* as illustrated in FIG. 5 (*c*), the pointed end of the cylindrical projection of the sleeve blank 22 may be flattened by a punch to be configured as a thrust bearing surface 6*c*, and then thrust hydrodynamic pressure generating grooves 6*d* may be formed on the bearing surface 6*c* as illustrated in FIG. 5 (*d*).

In the process above, the sleeve blank 22, a cylindrical projection, is manufactured (FIG. 5 (*b*)) and then the central shaft 6*a* is press-fitted into the cylindrical projection of the sleeve blank 22. However, when the cylindrically projected sleeve blank 22 is manufactured, a thin, flat plate material 21 is made by extrusion using the central shaft 6*a*, and the central shaft 6*a* to which the thin sleeve 5*b* illustrated in FIG. 5 © is fixed and fitted can be obtained at the same time as the cylindrical projection is formed.

As described above, since in the hydrodynamic bearing apparatus and its manufacturing method of the present invention, the thin sleeve is made thinner than the bearing body or shaft and capable of being evenly deformed, an excellent fitting can be performed while maintaining the circularity. Also, the thin sleeve is made of softer material than that of the bearing body or shaft for improving machinability, precision in predetermined machinings, such as a machining of hydrodynamic pressure generating grooves, can be improved and the machining time is shortened, thus prolonging tool life of the tools used for the predetermined machinings. In addition, while thinning the thin sleeve as much as possible, the bearing body or shaft for holding the thin sleeve is made thicker of a harder material than that of the thin sleeve. In this way, the apparatus is not easily affected by thermal expansion caused by changes in environmental temperature, making it possible to prevent the motor property from being degraded even when environmental temperature changes.

As described, the hydrodynamic bearing apparatus and its manufacturing method of the present invention can improve machining precision. Consequently, quality and reliability of the hydrodynamic bearing apparatus can be improved. In addition, machining time can be shortened, so tool life is also prolonged. Consequently, the rate of operation and productivity of a facility can be improved, thus reducing the investment cost for the facility and also reducing manufacturing cost.

While the foregoing description and drawings represent the preferred embodiments of the present invention, it will be readily appreciated by those of ordinary skill in the art that various changes may be made without departing from the spirit and scope of the invention. Therefore, it is intended that the appended claims be interpreted as including the embodiments described herein, the alternatives mentioned above, and all equivalents thereto.

What is claimed is:

1. A hydrodynamic bearing apparatus, comprising:

a bearing; and a shaft rotatably fitted to said bearing, hydrodynamic pressure generating grooves being cut on a bearing surface of at least one of said bearing and said shaft, said bearing surface having said hydrodynamic pressure generating grooves thereon facing another bearing surface so as to relatively rotate said bearing and said shaft, said at least one of said bearing and said shaft having said bearing surface on which said hydrodynamic pressure generating grooves are cut being comprised of a thick main body member and a thin sleeve fitted to said main body member, said thin sleeve being thinner and made of a softer material than said main body member, said thin sleeve being evenly deformed, and said hydrodynamic pressure generating grooves being cut on a surface of said thin sleeve.

2. The hydrodynamic bearing apparatus as set forth in claim 1, wherein said main body member is a thick bearing body whose inner surface constituting said bearing is circular; said thin sleeve is fixedly fitted to said inner circle surface of said bearing body; and said hydrodynamic pressure generating grooves are cut on an inner circle surface of said thin sleeve.

3. The hydrodynamic bearing apparatus as set forth in claim 2, wherein said thin sleeve is press-fitted to an inner circle surface of said bearing body.

4. The hydrodynamic bearing apparatus asset forth in claim 3, wherein said thin sleeve is between 0.1 mm to 0.6 mm thick.

5. The hydrodynamic bearing apparatus as set forth in claim 2, wherein said bearing body is made of a hard material having a thermal expansion lower than a thermal expansion of said thin sleeve; and said thin sleeve is made of a softer material than said hard material of said bearing body.

6. The hydrodynamic bearing apparatus as set forth in claim 5, wherein said thin sleeve is made of phosphorous bronze, brass, copper, nickel, or German silver.

7. The hydrodynamic bearing apparatus as set forth in claim 5, wherein said thin sleeve is thicker than a depth of said hydrodynamic pressure generating grooves, and said thin sleeve is press-fitted to said inner circle surface of said bearing body.

8. The hydrodynamic bearing apparatus as set forth in claim 5, wherein said bearing body of said bearing is cylindrical, and an outer circle of said bearing body is attached to an inner circle of a bearing holder formed on a fixed frame to rotatably support said shaft by hydrodynamic pressure generated by said hydrodynamic pressure generating grooves formed on said inner circle surface of said thin sleeve.

9. The hydrodynamic bearing apparatus as set forth in claim 5, wherein a fixed frame is integrally formed on an outer circle portion of said bearing body of said bearing as a single entity.

10. The hydrodynamic bearing apparatus as set forth in claim 5, wherein said bearing body of said bearing is cylindrical, and an outer circle of said bearing body is attached to an inner circle of a bearing holder formed on a rotary body so that said bearing is rotatably supported with respect to said shaft fixed on said fixed frame by hydrodynamic pressure generated by said hydrodynamic pressure generating grooves formed on said inner circle surface of said thin sleeve.

11. The hydrodynamic bearing apparatus as set forth in claim 5, wherein a rotary body for holding a disk is integrally formed on said outer circle of said bearing body of said bearing to be a single entity and rotatably supported with respect to said shaft fixed on a fixed frame by hydrodynamic pressure generated by said hydrodynamic pressure generating grooves formed on said inner circle surface of said thin sleeve.

12. The hydrodynamic bearing apparatus as set forth in claim 1, wherein said main body member is a thick central shaft whose outer circle surface consisting of said shaft is circular, and said thin sleeve is fixedly fitted to an outer circle surface of said central shaft.

13. The hydrodynamic bearing apparatus as set forth in claim 12, wherein said hydrodynamic pressure generating grooves are cut on said outer circle surface of said thin sleeve.

14. The hydrodynamic bearing apparatus as set forth in claim 13, wherein said thin sleeve is press-fitted to said outer circle surface of said central shaft.

15. The hydrodynamic bearing apparatus as set forth in claim 14, wherein said central shaft is made of a hard material having low thermal expansion, such as stainless steel, ferrous material, Ni-alloy, and the like; said thin sleeve is made of a softer material than that of said central shaft.

16. The hydrodynamic bearing apparatus as set forth in claim 15, wherein said central shaft is integrally fixed on said fixed frame.

17. The hydrodynamic bearing apparatus as set forth in claim 15, wherein a rotary body for holding a disk is integrally formed on an outer circle portion of said central shaft, and rotatably supported with respect to said bearing fixed on said fixed frame by a hydrodynamic pressure generated by said hydrodynamic pressure generating grooves formed on said outer circle surface of said thin sleeve.

18. The hydrodynamic bearing apparatus as set forth in claim 13, wherein said thin sleeve is made of phosphorous bronze, brass, copper, nickel, or German sliver.

19. The hydrodynamic bearing apparatus as set forth in claim 18, wherein said thin sleeve is between 0.1 mm to 0.6 mm thick.

20. The hydrodynamic bearing apparatus as set forth in claim 15, wherein said thin sleeve is thicker than the depth of said hydrodynamic pressure generating grooves; and said thin sleeve is press-fitted to an outer circle of said central shaft.

21. The hydrodynamic bearing apparatus as set forth in claim 12, wherein said thin sleeve is formed such that one of the pointed ends of said central shaft is covered; and said hydrodynamic pressure generating grooves are cut on a surface of said pointed end.

* * * * *